US012576934B2

(12) United States Patent　　　(10) Patent No.:　US 12,576,934 B2
Yoshihara et al.　　　　　　　　　(45) Date of Patent:　　Mar. 17, 2026

(54) ONE-OCCUPANT ELECTRIC VEHICLE

(71) Applicant: YAMAHA HATSUDOKI KABUSHIKI KAISHA, Iwata (JP)

(72) Inventors: Masanori Yoshihara, Shizuoka (JP); Shintaro Ohnishi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 291 days.

(21) Appl. No.: 18/374,703

(22) Filed: Sep. 29, 2023

(65) Prior Publication Data

US 2024/0017786 A1　　Jan. 18, 2024

Related U.S. Application Data

(63) Continuation of application No. PCT/JP2021/014384, filed on Apr. 2, 2021.

(51) Int. Cl.
　　　*B62K 5/007*　　　　(2013.01)
　　　*A61G 5/04*　　　　(2013.01)
　　　　　　(Continued)

(52) U.S. Cl.
　　　CPC ............... *B62K 5/007* (2013.01); *A61G 5/04* (2013.01); *A61G 5/122* (2016.11); *A61G 5/125* (2016.11);
　　　　　　(Continued)

(58) Field of Classification Search
　　　CPC ...... B62K 5/007; B62K 2204/00; A61G 5/04; A61G 5/122; A61G 5/125; B62J 1/18; B62J 25/04; B62J 1/26; B62J 1/007
　　　See application file for complete search history.

(56) References Cited

U.S. PATENT DOCUMENTS 3,833,259 A * 9/1974 Pershing .................. B60N 2/70
　　　　　　　　　　　　　　　　　　297/252
4,999,068 A * 3/1991 Chiarella ................... B62J 1/18
　　　　　　　　　　　　　　　　　　297/DIG. 2

(Continued)

FOREIGN PATENT DOCUMENTS

CN　　　204937344 U　*　1/2016
CN　　　112172988 A　　1/2021
　　　　　　(Continued)

OTHER PUBLICATIONS

Translated JP-2013215476-A (Year: 2025).*

(Continued)

*Primary Examiner* — James A Shriver, II
*Assistant Examiner* — Ian Bryce Shelton
(74) *Attorney, Agent, or Firm* — Keating & Bennett, LLP

(57)　　　　ABSTRACT

A one-occupant electric vehicle includes a seat to allow an occupant to sit thereon, a footboard to allow the occupant to place his/her feet thereon, front wheels and at least one rear wheel, and a motor to drive at least one of the wheels. A ratio of a diameter of the front wheels to a total length of the vehicle as measured in a front-rear direction is not less than 0.26, and a front portion of the seat on which the thighs of the occupant are to be placed is located higher than a rear portion of the seat on which the buttocks of the occupant are to be placed, and a rearmost point of a surface of the footboard on which the feet are to be placed is located rearward of a forwardmost point of an upper surface of the seat.

15 Claims, 7 Drawing Sheets

(51) Int. Cl.
    *A61G 5/12*            (2006.01)
    *B62J 1/18*            (2006.01)
    *B62J 25/04*          (2020.01)

(52) U.S. Cl.
    CPC ................. *B62J 1/18* (2013.01); *B62J 25/04*
        (2020.02); *B62K 2204/00* (2013.01)

(56) References Cited

U.S. PATENT DOCUMENTS

| | | | | |
|---|---|---|---|---|
| 5,108,076 A * | 4/1992 | Chiarella | ................... | B62J 1/18 |
| | | | | 297/214 |
| 5,720,518 A * | 2/1998 | Harrison | .................... | B62J 1/26 |
| | | | | 297/202 |
| 6,030,035 A * | 2/2000 | Yates | ......................... | B62J 1/18 |
| | | | | 297/214 |
| 6,290,794 B1 * | 9/2001 | Yates | ......................... | B62J 1/18 |
| | | | | 156/290 |
| 7,125,080 B1 * | 10/2006 | Jarema, III | ............ | A61G 5/125 |
| | | | | 297/411.3 |
| 10,300,972 B2 * | 5/2019 | Wu | ............................ | B62J 1/08 |
| 11,603,155 B2 * | 3/2023 | Arnold | .............. | B29C 66/73921 |
| 2002/0003052 A1 | 1/2002 | Hayashi | | |
| 2008/0231090 A1 | 9/2008 | Takeda et al. | | |
| 2010/0126789 A1 | 5/2010 | Scragg | | |
| 2014/0070576 A1 * | 3/2014 | Wu | ............................ | B62J 1/00 |
| | | | | 297/214 |
| 2019/0202513 A1 * | 7/2019 | Arnold | ....................... | B62J 1/26 |
| 2020/0010135 A1 * | 1/2020 | Arnold | ....................... | B62J 1/26 |
| 2021/0362794 A1 * | 11/2021 | Arnold | ....................... | B62J 1/26 |

FOREIGN PATENT DOCUMENTS

| | | | | | |
|---|---|---|---|---|---|
| DE | 20017704 U1 * | 1/2001 | ............ | B62K 5/007 | |
| DE | 102017201775 A1 * | 8/2018 | ............... | B62J 1/26 | |
| GB | 2563922 A * | 1/2019 | ............ | A61G 5/107 | |
| JP | 49-138546 U | 11/1974 | | | |
| JP | 2001301663 A * | 10/2001 | | | |
| JP | 2002-019655 A | 1/2002 | | | |
| JP | 2004-255168 A | 9/2004 | | | |
| JP | 2006-043338 A | 2/2006 | | | |
| JP | 2006102387 A * | 4/2006 | ............ | B62K 5/007 | |
| JP | 2006-123870 A | 5/2006 | | | |
| JP | 2007082880 A * | 4/2007 | | | |
| JP | 2008-247287 A | 10/2008 | | | |
| JP | 2013215476 A * | 10/2013 | | | |
| JP | 2014080080 A * | 5/2014 | ............ | B62K 5/007 | |
| JP | 2019-097601 A | 6/2019 | | | |
| JP | 2020048611 A * | 4/2020 | | | |
| WO | WO-2006041002 A1 * | 4/2006 | ............ | B62K 5/007 | |
| WO | WO-2007046266 A1 * | 4/2007 | ............ | B62K 5/007 | |
| WO | 2008/068529 A1 | 6/2008 | | | |
| WO | WO-2015129753 A1 * | 9/2015 | ............... | B60N 2/40 | |
| WO | WO-2019211946 A1 * | 11/2019 | ............... | B62M 7/12 | |

OTHER PUBLICATIONS

Translated WO-2006041002-A1 (Year: 2025).*
Official Communication issued in corresponding European Patent Application No. 21935047.7, mailed on Apr. 19, 2024.
Official Communication issued in International Patent Application No. PCT/JP2021/014384, mailed on Jun. 22, 2021.

* cited by examiner

ONE-OCCUPANT ELECTRIC VEHICLE

CROSS REFERENCE TO RELATED APPLICATIONS

This application is a Continuation Application of PCT Application No. PCT/JP2021/014384 filed on Apr. 2, 2021. The entire contents of this application are hereby incorporated herein by reference.

BACKGROUND OF THE INVENTION

1. Field of the Invention

The present invention relates to a one-occupant electric vehicle.

2. Description of the Related Art

One known example of a one-occupant electric vehicle is a handled electric wheelchair. A handled electric wheelchair is sometimes also referred to as "Senior Car" (registered trademark). For example, JP 2020-048611 A discloses a one-occupant electric vehicle with improved driving performance. This one-occupant electric vehicle includes a seat that allows an occupant to sit thereon, armrests, a footboard that allows the occupant to place his/her feet thereon, a set of wheels including four wheels, an electric motor that drives the wheels, an independent front suspension that supports the front wheels, and an independent rear suspension that supports the rear wheels.

A one-occupant electric vehicle provided with large-sized front wheels provides increased road-handling performance on an unpaved road and/or a step. On the other hand, increasing the diameter of the front wheels tends to narrow the space where the occupant can place his/her feet. As a result, the occupant may feel cramped.

SUMMARY OF THE INVENTION

Preferred embodiments of the present application provide one-occupant electric vehicles that each allow an occupant to ride in a natural posture while providing sufficient road-handling performance.

A one-occupant electric vehicle according to a preferred embodiment of the present invention includes a seat to allow an occupant to sit thereon, a footboard to allow the occupant to place a foot thereon, a set of wheels including front wheels and at least one rear wheel, and a motor to drive at least one wheel of the set of wheels. A ratio of a diameter Rf of the front wheels to a total length L0 of the one-occupant electric vehicle as measured in a front-rear direction of the vehicle is not less than about 0.26 ($0.26 \leq Rf/L0$), and a front portion of the seat on which a thigh of the occupant is to be placed is located higher than a rear portion of the seat on which a buttock of the occupant is to be placed, and a rearmost point of a surface of the footboard on which the foot is to be placed is located rearward of a forwardmost point of an upper surface of the seat.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
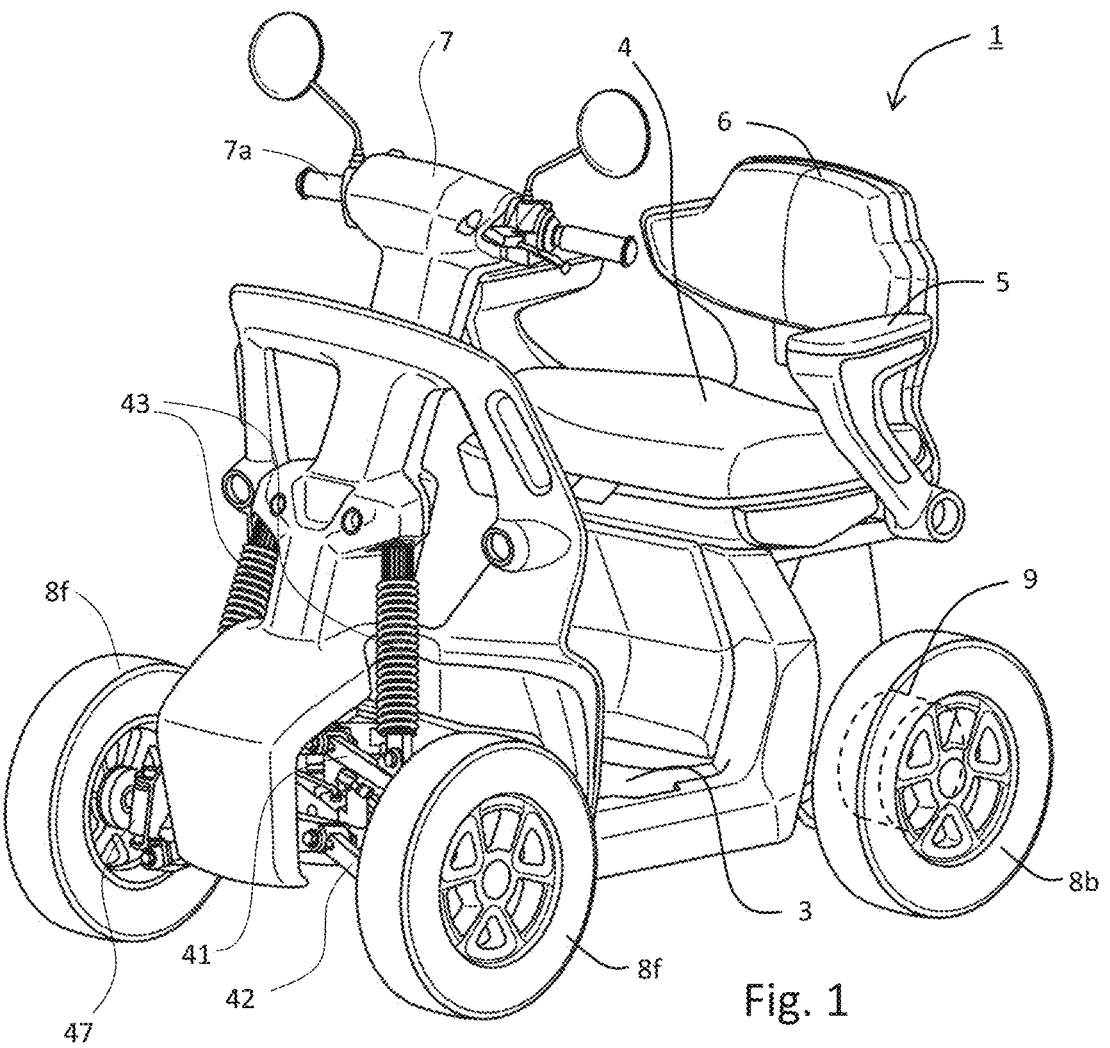
FIG. 1 is a perspective view showing an exemplary construction of a one-occupant electric vehicle according to a preferred embodiment of the present invention.

A one-occupant electric vehicle provided with large-sized front wheels provides increased road-handling performance on an unpaved road and/or a step. Particularly, the inventors of preferred embodiments of the present invention have discovered that increasing the diameter of the front wheels improves road-handling performance. For example, increasing the diameter of the front wheels makes it easier to ride over a step and/or overcome a groove and/or irregularities on the road surface. On the other hand, increasing the diameter of the front wheels tends to narrow the space where the occupant can place his/her feet. For example, a narrower space for the feet could make the occupant feel cramped, which means decreased comfort. In view of this, the inventors investigated a way to improve road-handling performance taking into account occupant comfort. The inventors conducted extensive research into seat and footboard constructions, and discovered an arrangement that allows the occupant to drive in a natural posture even with a narrow space for the feet.

A one-occupant electric vehicle according to a preferred embodiment of the present invention includes a seat to allow an occupant to sit thereon, a footboard to allow the occupant to place a foot thereon, a set of wheels including front wheels and at least one rear wheel, and a motor to drive at least one wheel of the set of wheels. A ratio of a diameter Rf of the front wheels to a total length L0 of the one-occupant electric vehicle as measured in a front-rear direction of the vehicle is not less than about 0.26 ($0.26 \leq Rf/L0$), and a front portion of the seat on which a thigh of the occupant is to be placed is located higher than a rear portion of the seat on which a buttock of the occupant is to be placed, and a rearmost point of a surface of the footboard on which the foot is to be placed is located rearward of a forwardmost point of an upper surface of the seat.

In the above described arrangement, the diameter of the front wheels of the one-occupant electric vehicle is not less than about 0.26 times the total length of the vehicle, thus providing sufficient road-handling performance. Since the front portion of the seat on which the thighs of the occupant are placed is located higher than the rear portion on which the buttocks of the occupant are placed, the thighs of the occupant sitting on the seat are raised upward relative to the buttocks. This allows the occupant to naturally pull the heels rearward so that he/she can sit with the upper portion of his/her body close to upright. As a result, the lower legs of the occupant are generally parallel to the upper portion of the body. This achieves an easy and comfortable posture for the occupant. This provides a one-occupant electric vehicle that allows the occupant to ride in a natural posture while providing sufficient road-handling performance.

As the ratio Rf/L0 increases, the wobbliness of the one-occupant electric vehicle during traveling decreases, thus improving the ride-over performance on a groove and a step. This improves the ride comfort of the one-occupant electric vehicle. However, if the ratio Rf/L0 is increased while the total length of the one-occupant electric vehicle remains the same as measured in the front-rear direction, this provides a narrower space for the occupant which reduces occupant comfort. As such, it is difficult to increase Rf/L0 with conventional techniques. With the above-described arrangement, the occupant can assume an easy posture even when 0.26≤Rf/L0, thus providing sufficient comfort. Rf/L0 is more preferably 0.27≤Rf/L0, and yet more preferably 0.28≤Rf/L0, for example. Although no particular upper limit for Rf/L0 is specified, an example may be Rf/L0≤0.45.

By way of example, in a side view of the vehicle, the angle θS of the upper surface of the seat relative to the horizontal plane may be greater than or equal to about 7° (7°≤θS). This makes it easier for the occupant to assume a posture where the lower legs and the upper portion of the body are upright. In this respect, the angle θS is preferably 8°≤θS, and more preferably 8.6≤θS, for example. To support an upright posture, the angle θS may be θS≤15°, for example.

In the one-occupant electric vehicle, the surface of the footboard on which the foot is placed may be constructed so as not to include a portion located above the front wheels in a side view. Thus, an area on which the occupant can place his/her feet is not positioned above the front wheels, which makes it easier for the occupant to assume a posture with the heels pulled rearward and the upper portion of the body upright. In the same respect, the footboard may be constructed such that the forwardmost point of the surface of the footboard on which the foot is placed is located rearward of the front wheels.

In implementations where the positioning of the seat of the one-occupant electric vehicle is adjustable, the positions of the forwardmost point and the rearmost point of the upper surface of the seat are defined as the forwardmost point and the rearmost point of the upper surface of the seat when the seat is adjusted to be positioned rearmost within the adjustment range.

The one-occupant electric vehicle may further include a handlebar to steer the front wheels. At least a portion of the footboard may be located between the handlebar and the seat as determined along the front-rear direction of the vehicle. When a steering angle of the handlebar is 0°, a rearmost point of a grip of the handlebar may be located rearward of a forwardmost point of a footboard, and a distance La between the rearmost point of the grip of the handlebar and a forwardmost point of the surface of the footboard on which the foot is placed as measured in the front-rear direction of the vehicle may be not larger than about 140 mm, for example. This allows the positions at which the feet are placed to be closer to the positions of the grips as measured in the front-rear direction. This makes it easier for the occupant to maintain a posture with the upper portion of the body being upright while grasping the grips.

In this respect, the distance La is preferably La≤100 mm, and more preferably La≤90 mm, for example. Further, to achieve an appropriate relationship between the grip positions and the positions for the feet in the front-rear direction, for example, preferably La≥50 mm, and more preferably La≥70 mm.

A distance Lb between a forwardmost point of the surface of the footboard on which the foot is placed and the forwardmost point of the upper surface of the seat as measured in the front-rear direction of the vehicle may be not larger than about 360 mm, for example. This reduces the space in which the lower legs of the occupant are positioned as measured in the front-rear direction making it possible to increase the diameter of the front wheels while keeping the total length within a predetermined range. Further, this results in the occupant sitting on the seat with the lower legs upright making it easier to naturally maintain a posture with the lower legs and the upper portion of the body being upright.

In the same respect, preferably Lb≤350 mm, and more preferably La≤340 mm, for example. The ratio of the distance Lb to the total length L0 is preferably Lb/L0≤0.30, more preferably Lb/L0≤0.29, and yet more preferably Lb/L0≤0.28, for example. Further, to provide a sufficient space for the feet, preferably Lb≥320 mm, and more preferably La≥330 mm, for example.

The one-occupant electric vehicle may further include a handlebar to steer the front wheels. When a steering angle of the handlebar is 0°, in a side view of the vehicle, an angle θA formed by an imaginary line connecting a rearmost point of a grip of the handlebar and a forwardmost point of the surface of the footboard on which the foot is placed on the one hand, and an imaginary line connecting the rearmost point of the grip of the handlebar and a rearmost point of the upper surface of the seat on the other hand, may be less than or equal to about 75° (θA≤75°), for example. Setting such a positional relationship among the handlebar, footboard, and seat makes it easier for the occupant sitting on the seat and grasping the handlebar to assume a posture with the lower legs and the upper portion of the body being upright and parallel or substantially parallel to each other.

In the same respect, preferably θA<73°, and more preferably θA≤70°, for example. Further, preferably θA≥60°, and more preferably θA≤65°, for example.

A distance H10 between an uppermost point of the upper surface of the seat and the surface of the footboard on which the foot is placed as measured in the top-bottom direction of the vehicle may be not smaller than about 405 mm, for example. This provides a sufficient height of the space in which the lower legs of the occupant can be positioned. This makes it easier for the occupant to naturally pull the heels rearward to get the upper portion of the body upright. In the same respect, preferably H10≥410 mm, and more preferably H10≥414 mm, for example. Further, to achieve an appropriate height of the space for the lower legs of the occupant, preferably H10≤430 mm, and more preferably H10≤420 mm, for example.

The one-occupant electric vehicle may further include a backrest to support a back of the occupant. A front surface of the backrest may include a portion located above the seat and extending forward of a rearmost point of the upper surface of the seat. This arrangement allows the back of the occupant sitting on the seat to be supported at a location forward of the rearmost point of the upper surface of the seat. This helps the occupant to get the upper portion of his/her body upright.

The backrest may include a backrest cushion and a back support body supporting the backrest cushion. The backrest cushion may be held by the back support body so as to be spaced apart from the upper surface of the seat. At least a portion of the backrest cushion may be located forward of the rearmost point of the upper surface of the seat. This enables efficient positioning of the backrest cushion to help the occupant to assume an upright posture.

The one-occupant electric vehicle may further include a handlebar to steer the front wheels, and an armrest provided to at least one of the left or the right of the seat. A distance H1 between a rearmost point of the upper surface of the seat and an uppermost point of the armrest as measured in a top-bottom direction of the vehicle may be not larger than about ⅔ of a distance Ha between the rearmost point of the upper surface of the seat and an uppermost point of a grip of the handlebar as measured in the top-bottom direction of the vehicle (H1≤Ha×(⅔)), for example. With this arrangement, when the occupant grasps the grips and operates the handlebar, an elbow of the occupant is less likely to contact the armrest. The occupant can operate the handlebar without placing an elbow on the armrest. As such, the occupant can actively operate the handlebar, for example. In this respect, more preferably H1<Ha×(⅔), yet more preferably H1≤Ha×(5/12), and still more preferably H1≤Ha×(½).

The one-occupant electric vehicle may further include a handlebar to steer the front wheels. A distance Ha between a rearmost point of the upper surface of the seat and an uppermost point of a grip of the handlebar as measured in the top-bottom direction of the vehicle may be greater than or equal to about 300 mm (Ha≥300 mm), for example. Such a large height between the sitting surface and the grips of the handlebar makes it easier for the occupant to support a posture with the upper portion of the body straightened up using his/her arms. This reduces the fatigue of the trunk of the occupant. Further, it allows more movement of the muscles of the back and trunk of the occupant when steering. In this respect, preferably Ha≥350 mm, and more preferably Ha≥360 mm, for example. Further, to achieve an appropriate height of the grip positions, for example, preferably Ha≤450 mm, and more preferably Ha≥400 mm, for example.

If the armrest is movably attached to the seat, the positioning and construction of the armrest is defined as the positioning and construction of the armrest when it is located lowest as determined along the top-bottom direction of the vehicle.

The one-occupant electric vehicle may further include an armrest provided to at least one of the left or the right of the seat. A distance H1 between a rearmost point of the upper surface of the seat and an uppermost point of the armrest as measured in a top-bottom direction of the vehicle may be less than about 200 mm (H1<200 mm), for example. This allows a wide range in which the occupant can move his/her arms while sitting on the seat. For example, the occupant can easily operate the handlebar without contacting the armrest. In this respect, preferably H1<195 mm, more preferably H1<190 mm, and yet more preferably H1<185 mm, for example. To provide a sufficient height of the armrest, preferably H1≥160 mm, and more preferably H1≥170 mm, for example.

The seat may include a sitting cushion. The sitting cushion may include a plurality of cushion materials having different amounts of impact resilience. In such implementations, one of the cushion materials positioned at a location where the buttock of the occupant is placed may have a higher impact resilience than other cushion materials positioned at other locations of the seat. When the occupant sits on the seat with the upper portion of the body upright, the weight of the upper portion of the body is concentrated on the portion for the buttocks. In view of this, creating a cushion arrangement where the portion on which the buttocks of the occupant are placed has a higher impact resilience than the other portions enables adjusting the amount of sink-in of the portion for the buttocks so as to create an appropriate pressure to give an appropriate feel of being held, thus making it easier for the occupant to maintain his/her posture.

In the sitting cushion of the seat, the cushion material positioned at the location where the buttock of the occupant is placed may include three stacked layers of cushion materials. An impact resilience of a middle one of the three layers may be higher than that of the other layers. This provides a sufficient sitting comfort for the occupant while minimizing the sink-in. Specifically, the occupant is less likely to feel the hardness of the surface of the sitting cushion, and also less likely to have the feel of bottom-hitting, where the occupant suddenly feels hardness after reaching a certain amount of sink-in.

The one-occupant electric vehicle may further include a backrest to support a back of the occupant. As determined along the front-rear direction of the vehicle, a rearmost point of the backrest may be at the same position as or forward of a rearmost point of the rear wheel. Thus, even in implementations with a large rear wheel, the rear wheel and backrest can be efficiently positioned within a limited total length.

The one-occupant electric vehicle may further include a backrest to support a back of the occupant. The backrest may be located rearward of an axle of the rear wheel. Thus, even in implementations with a large rear wheel, the rear wheel and backrest can be efficiently positioned within a limited total length.

A middle of the seat as determined along the front-rear direction of the vehicle may be located rearward of a forwardmost point of the rear wheel. Thus, even in implementations with a large rear wheel, the rear wheel and backrest can be efficiently positioned within a limited total length. Further, in the same respect, the middle of the seat as determined along the front-rear direction of the vehicle may be located rearward of the forwardmost point of the rear wheel and forward of the axle of the rear wheel.

The one-occupant electric vehicle may further include a vehicle-body frame, a rear arm attached to the vehicle-body frame to be rotatable about a pivot shaft to rotatably support the rear wheel, and a rear suspension provided between the vehicle-body frame and the rear arm. An upper portion of the rear suspension may be rotatably attached to the vehicle-body frame, and a lower portion of the rear suspension may be rotatably attached to the rear arm. In this arrangement, in a side view of the vehicle, the position at which the upper portion of the rear suspension is attached to the frame may be located forward of the middle of the seat as determined along the front-rear direction. Thus, as the suspension is extended and contracted, the axis of rotation of the upper portion of the suspension is positioned near the thighs of the occupant sitting on the seat. This makes it easier for the occupant to maintain a natural posture.

As used herein, unless specifically stated otherwise, the positions of the various components of the one-occupant electric vehicle are those in its design/empty condition, i.e., condition with equipment mass. Design/empty condition means a condition where no occupant is on the vehicle and no belongings or other objects are loaded but the vehicle is ready to be operated as soon as an occupant gets on. In implementations where a one-occupant electric vehicle includes, for example, a battery and a mirror, the vehicle in the design/empty condition includes these components. Further, as used herein, unless specifically stated otherwise, the positions of the various components are those found when the one-occupant electric vehicle is on a horizontal surface in the upright state. The upright state of a one-occupant electric vehicle means a state where the top-bottom direction of the vehicle is aligned with the vertical direction, i.e., the direction of gravity.

Further preferred embodiments of the present invention will be described in detail with reference to the drawings.

In the drawings, arrow F indicates the forward direction with respect to the vehicle. Arrow B indicates the rearward direction with respect to the vehicle. Arrow U indicates the upward direction with respect to the vehicle. Arrow D indicates the downward direction with respect to the vehicle. Arrow R indicates the right direction with respect to the vehicle. Arrow L indicates the left direction with respect to the vehicle.

The front-rear direction, left-right direction, and top-bottom direction of the vehicle are determined with respect to the vehicle-body frame of the one-occupant electric vehicle. In other words, the front-rear direction, left-right direction and top-bottom direction of the vehicle refer to the front-rear direction, left-right direction, and top-bottom direction of the vehicle-body frame. A side view means a view of the vehicle in the left-right direction. In the drawings, the top-bottom direction of the vehicle-body frame is aligned with the vertical direction. In other words, the drawings show the vehicle as being upright, without being inclined forward or rearward and without tilting to the left or right. Further, every one of the drawings shows a vehicle with its handlebar at a steering angle of 0°.

In the description provided below, mere statements of "front/forward" and "rear(ward)", "left" and "right", and "top/up(ward)" and "bottom/down(ward)" refer to the forward direction as determined along the front-rear direction of the vehicle, the rearward direction along the front-rear direction of the vehicle, the left direction along the left-right direction of the vehicle, the right direction along the left-right direction of the vehicle, the upward direction along the top-bottom direction of the vehicle, and the downward direction along the top-bottom direction of the vehicle, respectively.

FIG. 1 is a perspective view of a one-occupant electric vehicle according to a preferred embodiment, showing an exemplary construction. The one-occupant electric vehicle 1 (hereinafter sometimes merely referred to as "vehicle 1") includes a seat 4 to allow the occupant to sit thereon, a footboard 3 to allow the occupant to place his/her feet thereon, front wheels $8f$ and rear wheels $8b$, a handlebar 7 to steer the front wheels $8f$, grips $7a$, and motors 9 to drive the rear wheels $8b$. In the present implementation, the seat 4 is of the chair type, and not of the straddle type.

Figure 2:
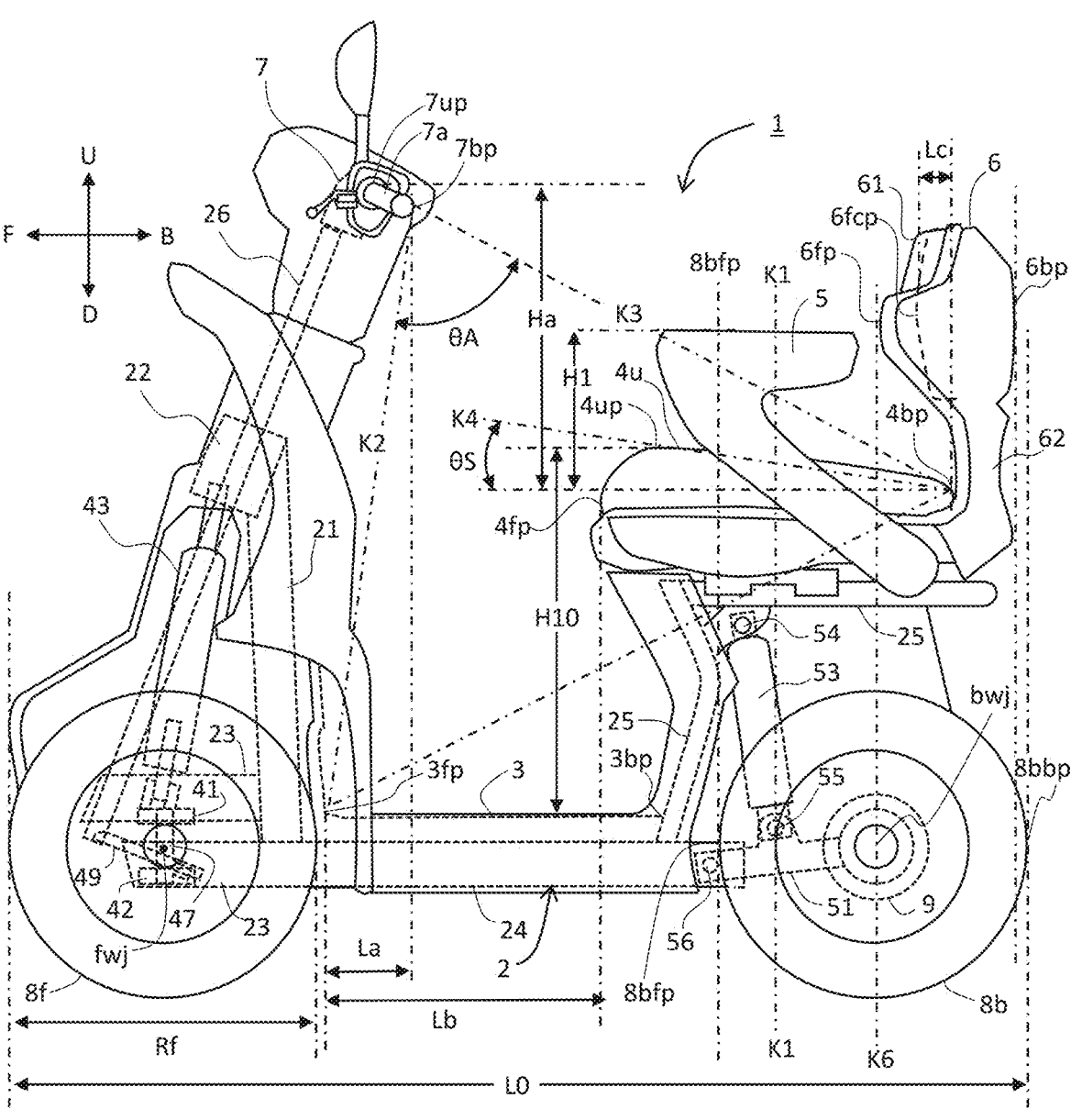
FIG. 2 is a side view of the vehicle shown in FIG. 1.
Figure 3:
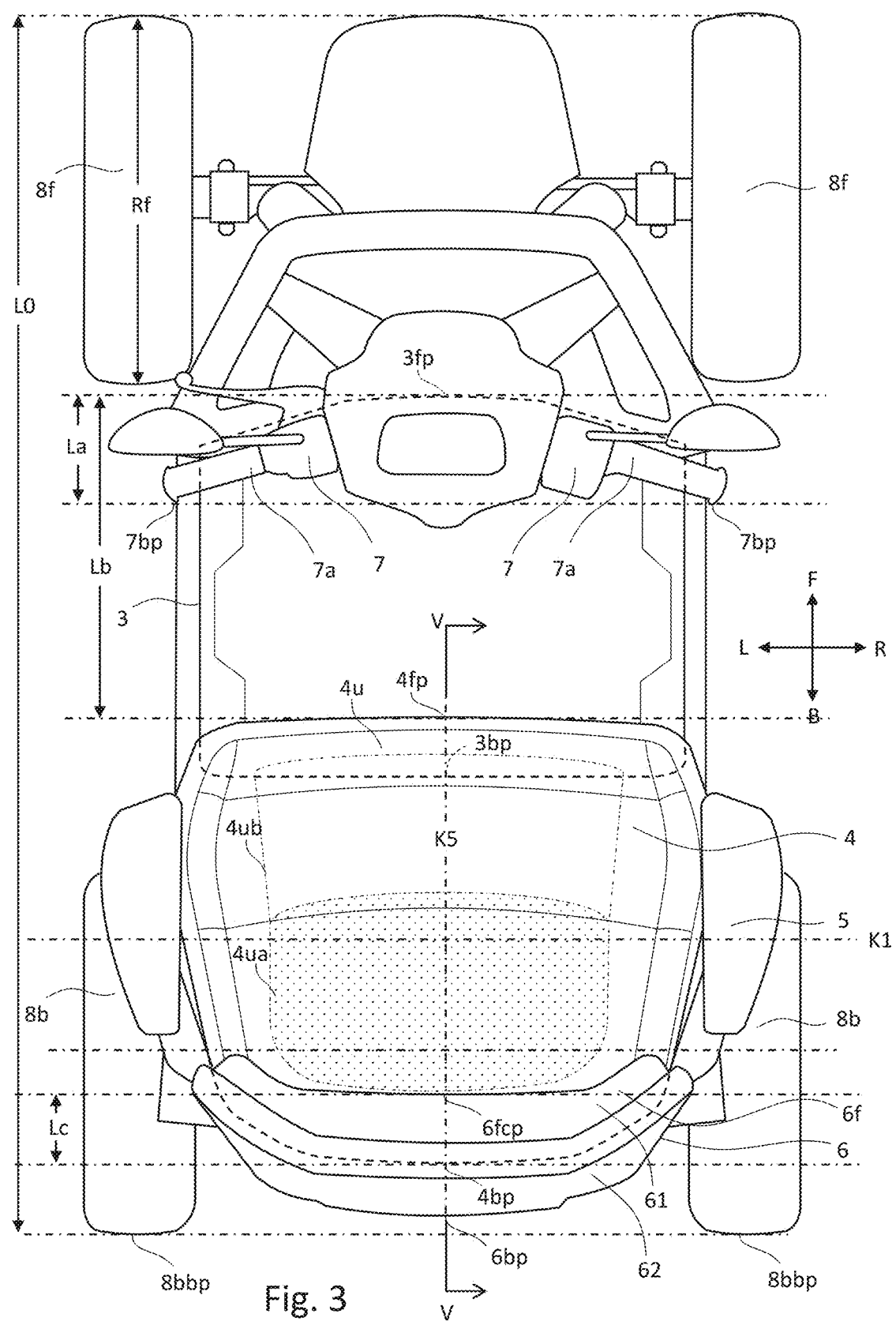
FIG. 3 is a top view of the vehicle shown in FIG. 2.

FIG. 2 is a side view of the vehicle 1 shown in FIG. 1. FIG. 3 is a top view of the vehicle 1 shown in FIG. 1. As shown in FIG. 2, the ratio of the diameter Rf of the front wheels $8f$ to the total length L0 of the vehicle 1 as measured in the front-rear direction is not less than about 0.26 (0.26≤Rf/L0), for example. Providing such a ratio of the diameter of the front wheels to the total length improves the ability to handle a groove and ride over a step. For example, in an implementation where the total length L0 is 1200 mm, which is a typical size for a one-occupant electric vehicle, the diameter Rf of the front wheels $8f$ is not smaller than (1200×0.26=) 312 mm. The inventors have discovered that, in such implementations, the vehicle is able to ride over an obstacle of about 5 cm, for example, with ease. The inventors have further discovered that, if 0.28≤Rf/L0, the vehicle is able to ride over a step of 5 cm by obliquely entering the relevant location, and also able to ride over a curbstone of 10 cm, for example.

Although the diameter Rb of the rear wheels $8b$ is not limited to any particular value, it may be, for example, similarly to the front wheels $8f$, 0.26≤Rb/L0, preferably 0.27≤Rb/L0, and more preferably 0.28≤Rb/L0. This improves road-handling performance.

In implementations shown in FIG. 2, in a construction with 0.26≤Rb/L0, for example, the seat 4 is constructed such that the front portion thereof on which the thighs of the occupant are placed is located higher than the rear portion on which the buttocks of the occupant are placed. Further, the footboard 3 is constructed such that the rearmost point $3bp$ of the surface on which the feet are placed is located rearward of the forwardmost point $4fp$ of the upper surface $4u$ of the seat 4. This allows the occupant to ride in a natural posture while providing a sufficient road-handling performance of the vehicle 1.

In FIG. 3, the portion $4ua$ of the seat 4 on which the buttocks of the occupant are placed is indicated by dots. Further, the position of the middle of the seat 4 as determined along the front-rear direction is indicated by line K1, while the position of the middle of the seat 4 as determined along the left-right direction is indicated by line K5. Thus, the middle of the seat 4 as determined along the front-rear direction in a top view is indicated by an imaginary line extending in the left-right direction along the middle between the forwardmost point $4fp$ and rearmost point $4bp$ of the upper surface $4u$ of the seat 4, as indicated by line K1.

In implementations shown in FIG. 3, in a top view, a region of the seat 4 that contains the middle along the left-right direction and includes portions located rearward of the middle K1 along the front-rear direction defines the portion $4ua$ on which the buttocks are placed. That is, a region of the seat 4 that includes an area located rearward of the middle K1 of the upper surface $4u$ along the front-rear direction and does not contact the left and right edges nor the front edge of the upper surface $4u$ of the seat 4 defines the portion $4ua$ on which the buttocks are placed. A region located forward of the portion $4ua$ on which the buttocks are placed defines the portion $4ub$ on which the thighs are placed. In such implementations, the portion for the thighs is a portion of a region extending from the portion $4ua$ for the buttocks all the way to the forwardmost point $4fp$ of the upper surface $4u$ of the seat 4 and in contact with the portion $4ua$ for the buttocks.

The height of the upper surface of the seat 4 as measured at the portion $4ua$ of the seat 4 on which the buttocks of the occupant are placed is less than the height of the upper surface of the seat 4 as measured at the portion $4ub$ on which the thighs are placed. For example, the upper surface $4u$ of the seat 4 may include a portion that is inclined so as to rise as it extends forward from a region rearward of the middle K1 of the seat 4 along the front-rear direction to a region located forward of the middle K1 along the front-rear direction. Thus, the portion $4ub$ for the thighs is located higher than the portion $4ua$ for the buttocks. It should be noted that implementations where the portion for the thighs is located higher than the portion for the buttocks are not limited to such implementations where the upper surface $4u$ of the seat 4 is inclined. For example, the upper surface $4u$ of the seat 4 may be constructed so as to rise stepwise from a position rearward of the middle K1 along the front-rear direction to a position forward of the middle.

In implementations with a sitting cushion, the forwardmost point $4fp$ of the upper surface $4u$ of the seat 4 is defined as the forwardmost point of the sitting cushion, and the rearmost point $4bp$ of the upper surface $4u$ of the seat 4 is defined as the rearmost point of the sitting cushion.

Although not limiting, in an exemplary implementation where the portion of the seat 4 for the thighs is located higher than the portion for the buttocks, for example, the angle θS of the upper surface $4u$ of the seat 4 relative to the horizontal plane in a side view may be greater than about 7° (7°<θs), as shown in FIG. 2. This makes it easier for the occupant to assume a posture with his/her lower legs and the upper portion of the body being upright. In this respect, the angle θS is preferably 8°≤θS, and more preferably 8.6≤θS, for example. To support an upright posture, the angle θS may be θS≤15°, for example.

Figure 4A:
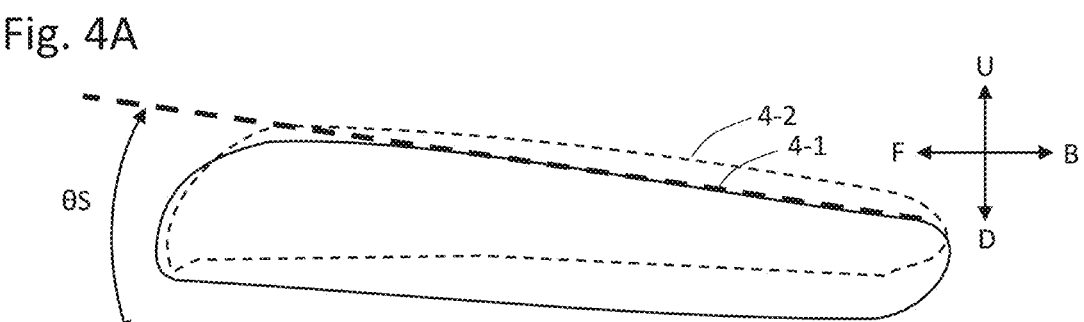
FIGS. 4A to 4D illustrate how to calculate the angle of an upper surface of the seat.

A method for calculating the angle θS of the upper surface 4*u* of the seat 4 relative to the horizontal plane will be described. FIGS. 4A to 4D illustrate how to calculate the angle θS. Line 4-1 in FIG. 4A indicates an exemplary shape, in a side view, of a portion of the seat 4 shown in FIG. 2 at the middle along the left-right direction. If a straight line dominating the angle of the upper surface of the seat can be defined in a region of the upper surface of the seat where the buttocks and thighs are placed, as shown in FIG. 4A, then, the angle between that straight line and the horizontal plane is treated as θS. The straight line used to determine the angle is a straight line in a plane perpendicular to the left-right direction of the vehicle. The dominating straight line is a line that conforms to the shape of the upper surface of the seat to some degree and can approximate the line of the upper surface of the seat.

In FIG. 4A, line 4-1 indicates the shape of a cross section of the region 4*ua* on which the buttocks are placed (i.e., along imaginary line K5 of the middle as determined along the left-right direction (see FIG. 3)). Line 4-2 indicates the shape of a cross section of protrusions, outward in the left-right direction, of the region 4*ua* on which the buttocks are placed. Thus, protrusions of the seat outside the region where the buttocks or thighs are placed are excluded from the measurement of the angle θS.

Figure 4B:
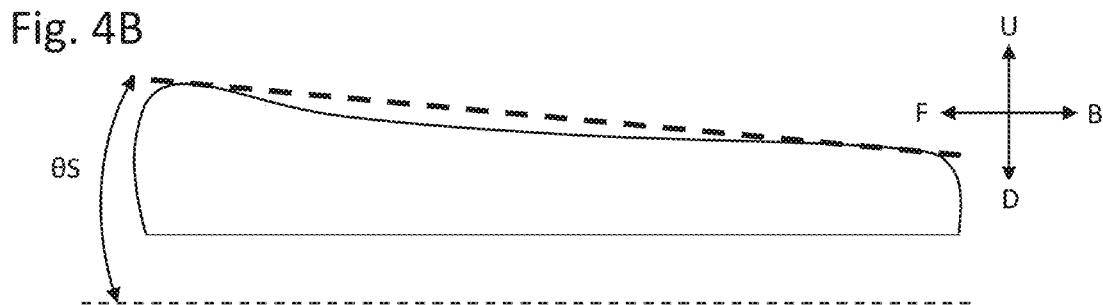

FIG. 4B shows an exemplary implementation with a seat with a recessed upper surface. In such an implementation, a straight line connecting the peaks on both sides of the recess can be defined. The angle of such a straight line defined by both peaks relative to the horizontal plane is treated as θS.

Figure 4C:
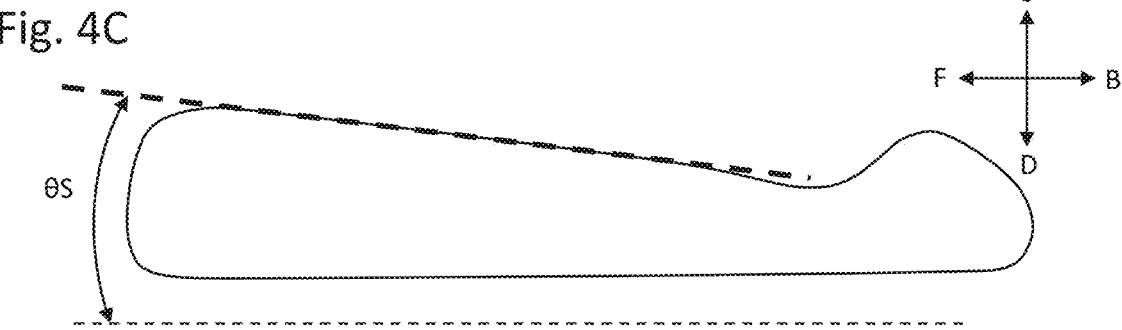

FIG. 4C shows an exemplary implementation with a seat with an upper surface including a projection. In such an implementation, the angle of a dominating straight line defined by portions excluding the projection relative to the horizontal plane is treated as θS. Thus, a projection of the upper surface of the seat outside the region where the buttocks and thighs are placed (e.g., lumbar support) is not taken into account when the angle θS is calculated.

Figure 4D:
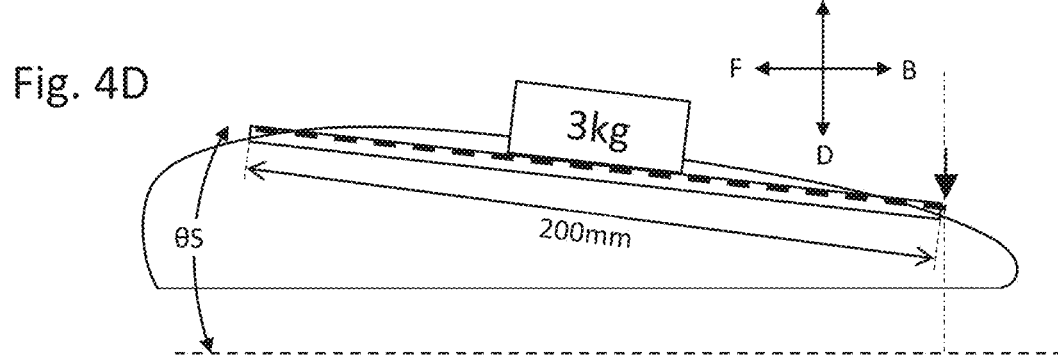

FIG. 4D shows an exemplary implementation with a seat with a generally protruding upper surface where no straight line dominating the angle can be defined. In such implementations where it is difficult to define a dominating straight line, a smooth plate with a dimension in the left-right direction of the vehicle of about 200 mm and a dimension in the front-rear direction of the vehicle of about 300 mm is placed on the upper surface of the seat, a weight of about 3 kg, for example, is put on the middle of the plate for stabilization, and the angle of the upper surface of the plate in this state relative to the horizontal plane is measured, which is treated as θS. The plate is positioned such that the middle of the plate as determined along the left-right direction is aligned with the middle of the upper surface of the seat as determined along the left-right direction and that the rear edge of the plate falls on the rearmost point of the region of the upper surface of the seat where the buttocks of the occupant can actually be placed.

The inclination of the portion 4*ua* of the upper surface 4*u* of the seat 4 on which the buttocks are placed need not be constant. For example, the portion 4*ua* where the buttocks are placed may be locally recessed to be located lower than the portion 4*bu* for the thighs.

As shown in FIG. 2, the rearmost point 3*bp* of the surface of the footboard 3 on which the feet are placed is located rearward of the forwardmost point 4*fp* of the upper surface 4*u* of the seat 4. This creates a space below the seat 4 to allow the occupant to place his/her feet below the seat 4. This makes it easier for the occupant to assume a posture with the upper portion of his/her body being upright.

Figures 5A, 5B:
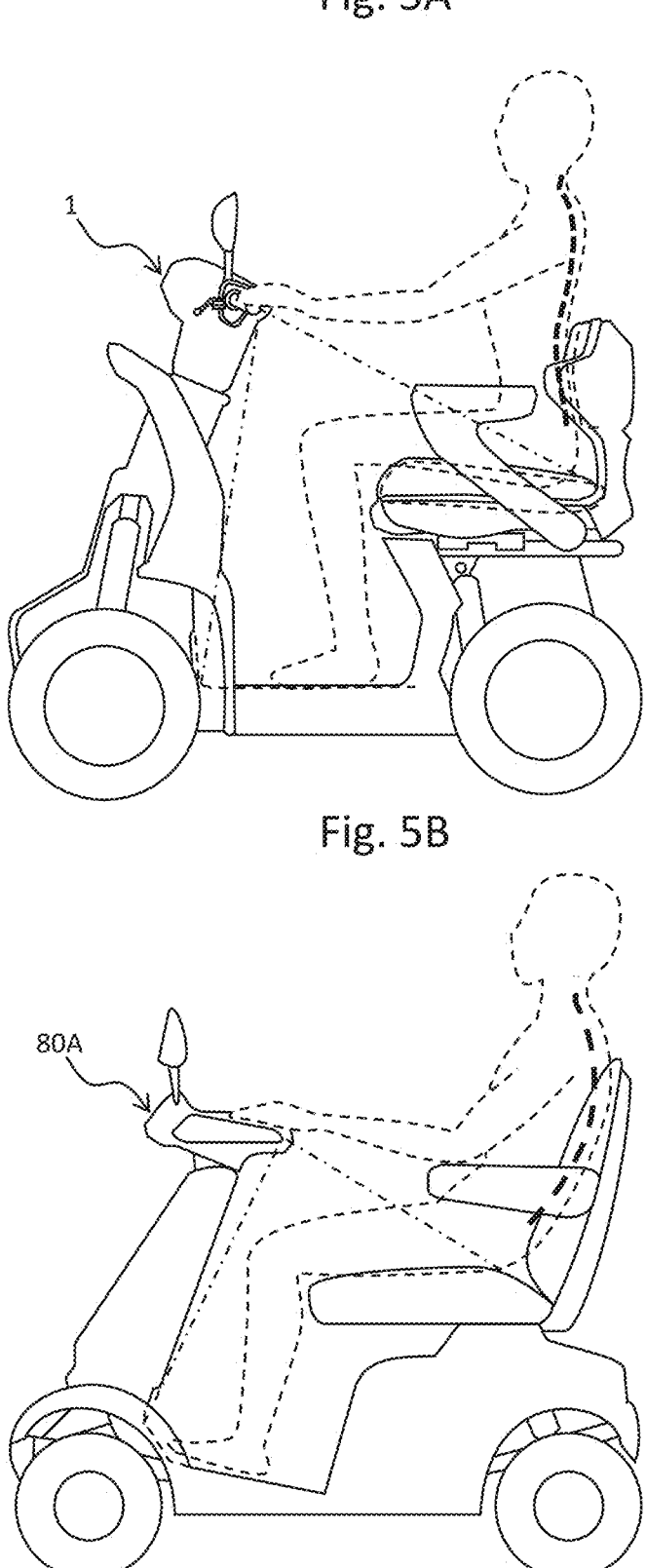
FIGS. 5A and 5B illustrate postures of the occupant on the vehicle according to preferred embodiments of the present invention.

FIGS. 5A and 5B illustrate the postures of the occupant on the one-occupant electric vehicle 1 according to a preferred embodiment. FIG. 5A shows an occupant riding the vehicle 1 shown in FIGS. 1 to 3. FIG. 5B shows an occupant riding a conventional one-occupant electric vehicle 80A. As shown in FIGS. 5A and 5B, in the vehicle 1 according to the present preferred embodiment, the above-described construction of the seat 4 and footboard 3 allows the thighs of the occupant sitting on the seat to rise upward of the buttocks. The occupant, while sitting, naturally pulls his/her heels rearward and raises the upper portion of the body closer to upright. As a result, the lower legs of the occupant are generally parallel to the upper portion of his/her body. At this time, the pelvis of the occupant is upright and the backbone is curved in an S-shape. This posture is easy and natural for the occupant. This posture is also preferable from a health perspective. On the other hand, in the example shown in FIG. 5B, the occupant assumes a posture with the upper portion of his/her body inclined rearward and leaning against the backrest. The lower legs of the occupant are oblique with the feet thrown forward. In this case, the pelvis of the occupant is inclined rearward and the backbone is curved in a C-shape. Further, as shown in FIG. 5A, the vehicle 1 according to the present preferred embodiment is constructed such that the dimension of the space for the occupant as measured in the front-rear direction can be reduced. In the case of FIG. 5A, the seat and footboard are constructed so as to naturally accommodate the occupant even when the knees are bent generally at an angle of 90° or less. This makes it possible to increase the diameter Rf of the front wheels 8*f*. As a result, it is possible to provide both road-handling performance and comfort. Further, a construction that increases the road-handling performance of the vehicle and makes it easier for the occupant to ride in an upright posture allows the occupant to enjoy an operation that gives him/her a feeling of independence.

As shown in FIG. 2, at least a portion of the footboard 3 is located between the handlebar 7 and the seat 4 as determined along the front-rear direction of the vehicle 1. When the steering angle of the handlebar 7 is 0°, the rearmost point 7*bp* of the grips 7*a* of the handlebar 7 is located rearward of the forwardmost point 3*fp* of the surface of the footboard 3 on which the feet are placed. The distance La in the front-rear direction of the vehicle 1 between the rearmost point 7*bp* of the grips 7*a* of the handlebar 7 and the forwardmost point 3*fp* of the surface of the footboard 3 on which the feet are placed may be, for example, about 40 mm to about 140 mm, although the distance is not limited to this range. This achieves an appropriate relationship between the position of the handlebar 7 and the positions at which the feet are placed, making it easier for the occupant to assume an upright posture. By way of example, if La≤90 mm, the occupant, particularly sitting on the seat 4 and grasping the grips 7*a* of the handlebar 7, can easily assume an upright posture. On the other hand, if the distance La is too large, the occupant grasping the grips 7*a* of the handlebar 7 can easily fall into a posture with his/her feet thrown forward (see FIG. 5B).

The distance in the front-rear direction of the vehicle between the forwardmost point 3*fp* of the surface of the footboard 3 on which the feet are placed and the forward-most point 4*fp* of the upper surface 4*u* of the seat 4, Lb, may be about 320 mm to about 360 mm, for example, although this distance is not limited to this range. The surface of the footboard 3 on which the feet are placed is the upper surface of the footboard 3. The surface on which the feet are placed need not be a flat surface. In the present preferred embodiments, by way of example, the entire surface of the footboard 3 on which the feet are placed is parallel or substantially parallel to the horizontal plane.

As shown in FIG. 2, in a side view of the vehicle 1, the angle θA formed by an imaginary line K2 connecting the rearmost point 7*bp* of the grips 7*a* of the handlebar 7 at a steering angle of 0° and the forwardmost point 3*fp* of the surface of the footboard 3 on which the feet are placed, and an imaginary line K3 connecting the rearmost point 7*bp* of the grips 7*a* of the handlebar 7 and the rearmost point 4*bp* of the upper surface 4*u* of the seat 4 may be less than or equal to about 75° (θA≤75°), for example. Providing such a positional relationship among the grips 7*a* of the handlebar 7, the footboard 3, and the seat 4 makes it easier for the occupant sitting on the seat 4 and grasping the handlebar 7 to assume a posture with the lower legs and the upper portion of the body being upright. For example, if the angle θA is too large, the occupant grasping the grips can easily fall into a posture with the feet thrown forward (see FIG. 5B).

Referring to FIG. 2, the distance Ha in the top-bottom direction of the vehicle 1 between the rearmost point 4*bp* of the upper surface 4*u* of the seat 4 and the uppermost point 7*up* of the grips 7*a* of the handlebar 7 may be, for example, about 300 mm≤Ha≤about 450 mm, although this distance is not limited to this range. This makes it easier for the occupant sitting on the seat 4 and grasping the grips 7*a* to support a posture with the upper portion of the body straightened up using his/her arms.

The distance H10 in the top-bottom direction of the vehicle between the uppermost point 4*up* of the upper surface 4*u* of the seat 4 and the surface of the footboard 3 on which the feet are placed may be not smaller than about 405 mm, for example. This provides a sufficient height of the seat 4, i.e., leg height, to allow the occupant sitting on the seat 4 to get his/her lower legs vertical. If the surface of the footboard 3 on which the feet are placed is not horizontal, the distance from the highest position of the surface on which the feet are placed to the uppermost point 4*up* of the upper surface 4*u* of the seat 4 is treated as H10.

In implementations shown in FIG. 2, the vehicle 1 further includes a backrest 6 that supports the back of the occupant. The backrest 6 is coupled to the rearmost point 4*bp* of the upper surface 4*u* of the seat 4. The backrest 6 extends upward from the rearmost point 4*bp* of the upper surface 4*u* of the seat 4. The front surface 6*f* of the backrest 6 may include a portion located above the seat 4 that extends forward of the rearmost point 4*bp* of the upper surface 4*u* of the seat 4. This allows the back of the occupant sitting on the seat 4 to be supported at a position forward of the rearmost point 4*bp* of the upper surface 4*u* of the seat 4 (see FIG. 5A). The backrest 6 supports the upright posture of the upper portion of the body of the occupant.

In implementations shown in FIG. 2, the backrest 6 includes a backrest cushion 61 and a back support body 62 that supports the backrest cushion 61. The backrest cushion 61 is held by the back support body 62 to be spaced apart from the upper surface 4*u* of the seat 4 and to be at least partially located forward of the rearmost point 4*bp* of the upper surface 4*u* of the seat 4. The front surface of the backrest cushion 61 represents the front surface 6*f* of the backrest 6 to support the back of the occupant. The back support body 62 may be formed integrally with the seat support body that supports the sitting cushion of the seat 4.

In implementations shown in FIG. 2, the rearmost point 6*bp* of the backrest 6 is located forward of the rearmost point 8*bbp* of the rear wheels 8(*b*). This construction prevents the back of the occupant sitting on the seat 4 from being located rearward of the rearmost point 8*bbp* of the rear wheels 8*b*. In this arrangement, in a side view, the portion of the upper surface 4*u* of the seat 4 on which the buttocks of the occupant are placed overlaps an imaginary line K6 that perpendicularly passes through the axle bwj of the rear wheels 8*b*. The occupant, by getting the upper portion of the body upright above the rear wheels 8, can have an increased feeling of being integrated with the vehicle 1. This same effect can also be produced in implementations where the rearmost point 6*bp* of the backrest 6 is at the same position as the rearmost point 8*bbp* of the rear wheels 8*b* as determined along the front-rear direction of the vehicle 1.

In implementations shown in FIG. 2, the entire backrest 6 is located rearward of the axle bwj of the rear wheels 8*b*. Thus, in a side view, the seat 4 overlaps imaginary line K6 that passes perpendicularly through the axle bwj of the rear wheels 8*b*. In this construction, too, the occupant, sitting on the seat 4, and getting the upper portion of the body upright above the rear wheels 8*b*, can have an increased feeling of being integrated with the vehicle 1.

In implementations shown in FIG. 3, the position of the middle of the seat 4 as determined along the left-right direction is indicated by imaginary line K5. As measured along the middle of the seat 4 as determined along the left-right direction, the distance in the front-rear direction of the vehicle 1 between the rearmost point 4*bp* of the upper surface 4*u* of the seat 4 and the forwardmost point 6*fcp* of the front surface 6*f* of the backrest 6, Lc, may be, for example, about 40 mm≤Lc≤about 60 mm.

In implementations shown in FIGS. 2 and 3, the middle of the seat 4 as determined along the front-rear direction of the vehicle, indicated by imaginary line K1, is located rearward of the forwardmost point of the rear wheels 8*b*. Thus, in a side view, the portion of the upper surface 4*u* of the seat 4 on which the buttocks of the occupant are placed overlaps imaginary line K6 that passes perpendicularly through the axle bwj of the rear wheels 8*b*.

In implementations shown in FIG. 2, the vehicle 1 further includes armrests 5. As shown in FIGS. 1 and 3, the armrests 5 are provided to the left and right of the seat 4. The armrests 5 are attached to the sides of the seat 4. The armrests extend upward from the sides of the seat 4. An upper portion of each armrest 5 defines a stand that extends in the front-rear direction. The top surface of each stand is a flat surface. Each armrest 5 may be attached to the seat to be rotatable about an axis extending in the left-right direction.

The distance H1 in the top-bottom direction of the vehicle between the rearmost point 4*bp* of the upper surface 4*u* of the seat 4 and the uppermost point of the armrests 5, H1, may be, for example, less than about 200 mm (H1<200 mm). As the height of the armrests 5 is thus reduced relative to the seat 4, the elbows of the occupant are less likely to hit the armrests 5 during his/her operation on the handlebar. Thus, when the occupant sitting on the seat 4 in a posture with the upper portion of the body being upright operates the handlebar, the armrests 5 do not hamper the operation. The armrests 5 of this construction, by specification, are not intended to allow the elbows to be placed thereon during the occupant's operation on the handlebar.

Alternatively, the distance H1 may be not larger than ⅔ of the distance Ha in the top-bottom direction of the vehicle 1 between the rearmost point 4*bp* of the upper surface 4*u* of the seat 4 and the uppermost point 7*up* of the grips 7*a* of the handlebar 7 (H1≤Hax(⅔)). In this construction, too, the elbows of the occupant are less likely to hit the armrests when the occupant grasps the grips 7*a* and operates the handlebar.

Figure 6:
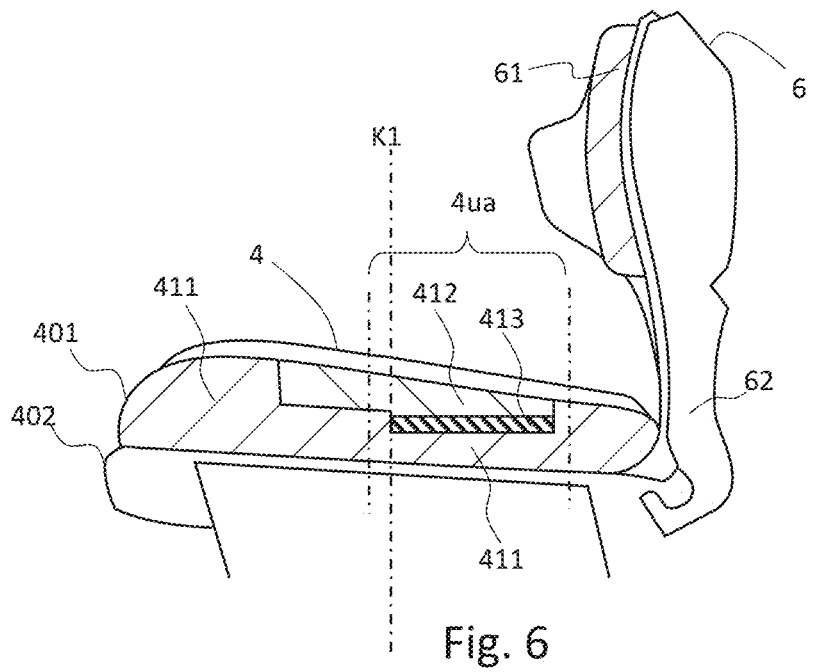
FIG. 6 is a cross-sectional view of the vehicle taken along line V-V of FIG. 3.

FIG. 6 is a cross-sectional view of the seat and backrest of FIG. 3 taken along line V-V. In implementations shown in FIG. 6, the seat 4 includes a sitting cushion 401 and a seat support body 402 that supports a lower portion of the sitting cushion 401. The sitting cushion includes a plurality of cushion materials 411 to 413 having different amounts of impact resilience. The cushion material with a high impact resilience 413 is positioned in the portion of the cushion on which the buttocks of the occupant are placed. The impact resilience of the cushion material 413 is higher than that of the other cushion materials 411 and 412. Cushion material having high impact resilience means a hard cushion, or a cushion with high elasticity. Non-limiting examples of cushion materials with high impact resilience include materials of closed cell structure or foamed silicone. The impact resilience of a cushion material is determined by the method of determining impact resilience specified by JIS K6500-3: 2011.

Preferably, the region in which the cushion material with high impact resilience 413 is positioned is the portion of the seat 4 on which the buttocks of the occupant are placed, i.e., the portion on which the weight of the occupant is concentrated. For example, within the sitting cushion 401, the cushion material with a higher impact resilience 413 may be positioned rearward of the middle K1 of the seat 4 as determined along the front-rear direction, extending across the middle K5 as determined along the left-right direction and not in contact with the left nor right edges nor the front edge of the seat 4.

In the vehicle 1 according to a preferred embodiment, the occupant sitting on the seat 4 can easily get the upper portion of his/her body upright. Thus, the weight of the occupant tends to be concentrated on the portion of the seat 4 on which the buttocks of the occupant are placed. To improve the sitting comfort of the occupant, it is preferable that the entire sitting cushion of the seat 4 is relatively soft. However, if the entire seat 4 is uniformly soft, the weight is concentrated on a limited portion and, when the load exceeds a threshold, hardness is suddenly felt. In this case, the occupant has the feel of bottom-hitting. In view of this, the sink-in at the location of load concentration is mitigated by positioning the cushion material 413 with a higher impact resilience than the other cushion materials 411 and 412 within the portion 4*ua* of the sitting cushion 401 where the buttocks are placed, as shown in FIG. 6.

The cushion material with a high impact resilience 413 may be positioned to overlie another cushion material 412 with a lower impact resilience such that these materials are arranged in the top-bottom direction of the vehicle 1. This mitigates the sink-in at the location of load concentration while retaining softness. In implementations shown in FIG. 6, the cushion material with a higher impact resilience 413 is positioned between the cushion materials with lower amounts of impact resilience 411 and 412 such that all these materials are arranged in the top-bottom direction of the vehicle 1. In this implementation, the portion 4*ua* of the sitting cushion 401 of the seat 4 on which the buttocks of the occupant are placed includes three stacked cushion materials 412, 413 and 411. The impact resilience of the middle one of the three layers is higher than that of the other layers, i.e., this layer is harder and more elastic than the other layers.

Thus, in the portion 4*ua* of the sitting cushion 401 on which the buttocks are placed, the cushion material with high impact resilience 413 is positioned between the cushion materials with low impact resilience 411 and 412. The other portions of the sitting cushion 401 are provided by the cushion materials with low impact resilience 411 and 412. Thus, the portion of the sitting cushion 401 on which the load is concentrated is also recessed only to some degree and deforms with the surrounding portions. This makes it possible to achieve both the reduction of sink-in and the improvement of the feeling of being held.

Figure 7:
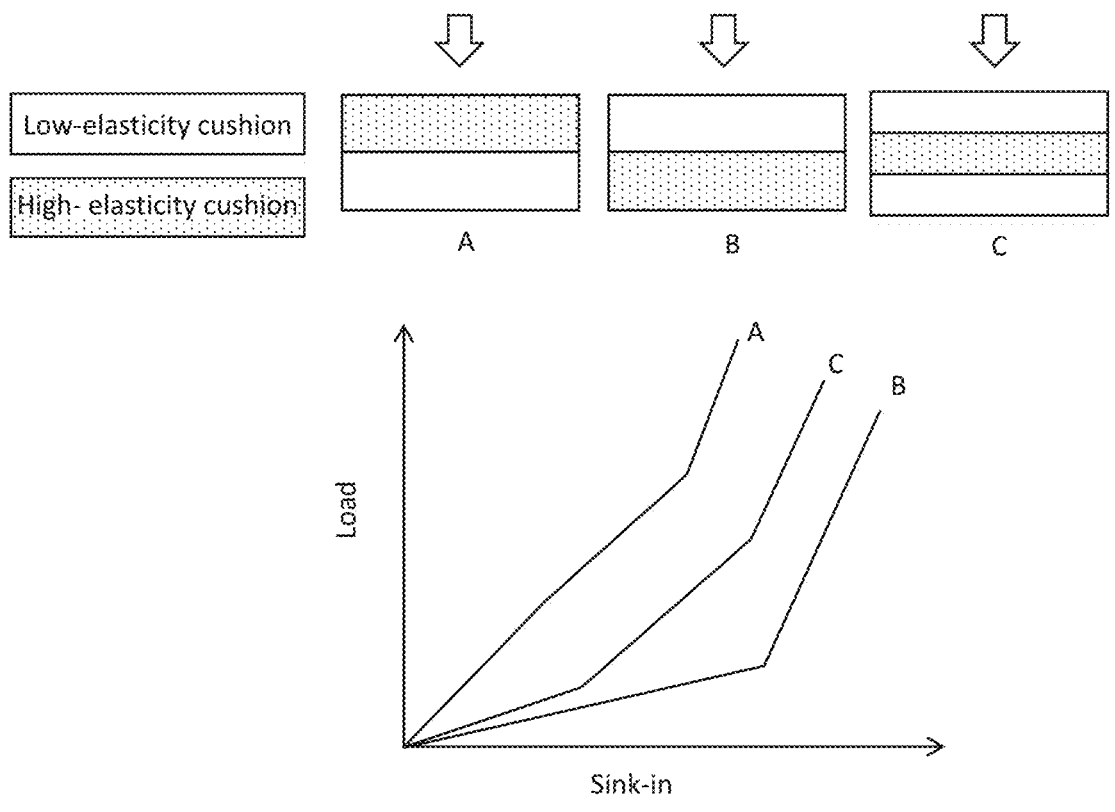
FIG. 7 is a graph showing relationships between a load on and sink-in of stacked cushion materials of the seat.

FIG. 7 is a graph illustrating exemplary relationships between the load on the cushion made of a plurality of stacked cushion materials with different amounts of impact resilience, on the one hand, and the amount of sink-in, on the other. The examples shown in FIG. 7 show such relationships for structures A and B, which each have two layers stacked in the load direction, one being a hard cushion layer with high elasticity and the other being a soft cushion layer with low elasticity, and a structure C with three layers, where a hard layer is positioned between soft layers. The graph of FIG. 7 shows that, if a cushion with high elasticity is placed on top of a cushion with low elasticity (i.e., defines a top layer), as in structure A, the amount of sink-in in response to a load is small from the beginning. In the case of structure A, the occupant feels hardness. If the lower layer is hard and the upper layer is soft, as in structure B, the occupant feels softness at the beginning but suddenly feels hardness at an early point of time. The occupant has the feeling of bottom-hitting, where sink-in suddenly stops. If a cushion with high elasticity is placed in the middle of a three-layer structure, as in structure C, hardness gradually increases with increased load. In this case, it is possible to control the occupant's feelings of the softness at the beginning, sink-in and increasing hardness at an intermediate stage, and bottom-hitting at the end.

Returning to FIG. 2, the vehicle 1 includes a vehicle-body frame 2. The vehicle-body frame 2 includes a lower frame portion 24 at a lower location of the vehicle 1 extending in the front-rear direction, a down tube 21 coupled to a front portion of the lower frame portion 24, a head pipe 22 attached to a front portion of the down tube 21, a front frame portion 23 located forward of the lower frame portion 24, and a seat frame portion 25 extending upward from a rear portion of the lower frame portion 24 to support the seat 4.

The head pipe 22 rotatably supports the steering axle 26. The handlebar 7 is attached to the top of the steering axle 26. One end of each of arms 41 and 42 is rotatably attached to the front frame portion 23. The other ends of the arms 41 and 42 are rotatably attached to a knuckle arm 47. The knuckle arms 47 rotatably support the front wheels 8*f*. The arms 41 and 42 include pairs of arms 41 and 42 disposed at the top and bottom. Coupled to the bottom of the steering axle 26 is a pitman arm 49 that rotates together with the steering axle 26. The pitman arm 49 is coupled to the knuckle arms 47, with a tie rod (not shown) provided therebetween. The rotation of the steering axle 26 is transmitted to the front wheels 8*f* via the pitman arm 49, tie rod, and knuckle arms 47.

Front suspensions 43 are provided between the arms 41 and vehicle-body frame 2 (i.e., head pipe 22 in the implementations of FIG. 2). One end of each front suspension is rotatably attached to the vehicle-body frame 2, while the other end is rotatably attached to the associated arm 41. The front suspensions 43 and arms 41 and 22 define an independent front suspension system. The front suspension system may be, for example, a wishbone suspension.

As shown in FIGS. 1 and 3, the front wheels 8*f* are implemented as two wheels disposed to the left and right. Thus, a pair of arms 41 and 42, a knuckle arm 47, and a front suspension 43 are provided for each of the two front wheels 8*f* to the left and right.

The vehicle 1 further includes a rear arm 51. The rear arm 51 is attached to the vehicle-body frame 2 to be rotatable about a pivot shaft 56, and rotatably supports a rear wheel 8*b*. A rear suspension 53 is provided between the vehicle-body frame 2 (i.e., seat frame portion 25 in the implementations of FIG. 2) and the rear arm 51. One end of the rear suspension 53 is rotatably attached to the vehicle-body frame 2, while the other end is rotatably attached to the rear arm 51. The rear suspension 53 and rear arm 51 define an independent rear suspension system. The rear suspension system may be, for example, a trailing arm suspension. The front and rear suspensions 43 and 53 are axially extendable shock absorbers, and include a coil spring and a damper, for example.

In implementations shown in FIG. 2, the location at which an upper portion of the rear suspension 53 is attached to the vehicle-body frame 2 (i.e., seat frame portion 25) is located forward of the middle K1 of the seat 4 as determined along the front-rear direction in a side view of the vehicle 1. That is, the axis of rotation of the upper portion of the rear suspension 53 is located forward of the middle K1 of the seat 4 as determined along the front-rear direction. When the rear suspension 53 is contracted or extended, the rear suspension 53 rotates relative to the vehicle-body frame 2 about the axis of rotation located forward of the middle K1 of the seat 4 as determined along the front-rear direction. Thus, as the rear suspension 53 is contracted or extended, the axis of rotation is positioned near the thighs of the occupant sitting on the seat 4. This makes it easier for the occupant to keep a natural posture.

The rear suspension 53 is inclined forward such that an upper portion thereof is located forward of a lower portion when the suspension is extended to the maximum. That is, the attachment position of the upper portion of the rear suspension 53 is located forward of the attachment position of the lower portion thereof. Thus, the attachment position of the upper portion of the rear suspension 53 is located close to the thighs of the occupant sitting on the seat 4.

The vehicle 1 according to a preferred embodiment includes an independent front suspension system and an independent rear suspension system. This improves the ability to follow irregularities of the road surface. Further, it increases the ability of the vehicle 1 to turn.

A motor 9 is provided on the rear arm 51. The motor 9 is preferably an in-wheel motor. The motor 9 drives the rear wheel 8*b*. An output shaft of the motor 9 is coupled to the rear wheel 8*b* via a gear (not shown).

As shown in FIGS. 1 and 3, the rear wheel 8*b* is implemented as two wheels disposed to the left and right. Thus, a pair of rear arms 51, a rear suspension 53, and a motor 9 are provided for each of the two rear wheels 8*b* to the left and right. Alternatively, a motor 9 may only be provided on one of the two rear wheels 8*b* to the left and right. In lieu of the motor for the rear wheel 8*b*, or in addition to the motor for the rear wheel 8*b*, a motor may be provided on the front wheel 8*f*.

In implementations shown in FIG. 1, the one-occupant electric vehicle 1 is a four-wheel, handled electric wheelchair. The one-occupant electric vehicle 1 is not limited to a four-wheel, handled electric wheelchair as illustrated herein.

The one-occupant electric vehicle 1 may be, for example, a joy-stick electric wheelchair. The one-occupant electric vehicle 1 is not limited to an electric wheelchair. In other implementations, it may be a one-occupant carrier wagon or electric cart, for example. Furthermore, the number of wheels may be three or four or more. For example, in lieu of two rear wheels, one wheel may be provided.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A one-occupant electric vehicle comprising:
a seat to allow an occupant to sit thereon;
a footboard to allow the occupant to place a foot thereon;
a set of wheels including front wheels and at least one rear wheel; and
a motor to drive at least one wheel of the set of wheels; wherein
a ratio of a diameter of the front wheels to a total length of the one-occupant electric vehicle as measured in a front-rear direction of the vehicle is not less than about 0.26 and not more than about 0.45; and
a front portion of the seat on which a thigh of the occupant is to be placed is located higher than a rear portion of the seat on which a buttock of the occupant is to be placed, and a rearmost point of a surface of the footboard on which the foot is to be placed is located rearward of a forwardmost point of an upper surface of the seat.

2. The one-occupant electric vehicle according to claim 1, further comprising:
a handlebar to steer the front wheels; wherein
at least a portion of the footboard is located between the handlebar and the seat along the front-rear direction of the vehicle; and
when a steering angle of the handlebar is 0°, a rearmost point of a grip of the handlebar is located rearward of a forwardmost point of a footboard, and a distance between the rearmost point of the grip of the handlebar and a forwardmost point of the surface of the footboard on which the foot is to be placed as measured in the front-rear direction of the vehicle is not larger than about 140 mm.

3. The one-occupant electric vehicle according to claim 1, wherein a distance between a forwardmost point of the surface of the footboard on which the foot is to be placed and the forwardmost point of the upper surface of the seat as measured in the front-rear direction of the vehicle is not larger than about 360 mm.

4. The one-occupant electric vehicle according to claim 1, further comprising:
a handlebar to steer the front wheels; wherein
when a steering angle of the handlebar is 0°, in a side view of the vehicle, an angle formed by an imaginary line connecting a rearmost point of a grip of the handlebar and a forwardmost point of the surface of the footboard on which the foot is to be placed, and an imaginary line connecting the rearmost point of the grip of the handlebar and a rearmost point of the upper surface of the seat is less than or equal to about 75°.

5. The one-occupant electric vehicle according to claim 1, wherein a distance between an uppermost point of the upper surface of the seat and the surface of the footboard on which the foot is to be placed as measured in a top-bottom direction of the vehicle is not smaller than about 405 mm.

6. The one-occupant electric vehicle according to claim 1, further comprising:

a backrest to support a back of the occupant; wherein a front surface of the backrest includes a portion located above the seat and extending forward of a rearmost point of the upper surface of the seat.

7. The one-occupant electric vehicle according to claim 6, wherein the backrest includes a backrest cushion and a back support body supporting the backrest cushion; and the backrest cushion is held by the back support body so as to be spaced apart from the upper surface of the seat; and at least a portion of the backrest cushion is located forward of the rearmost point of the upper surface of the seat.

8. The one-occupant electric vehicle according to claim 1, further comprising:

a handlebar to steer the front wheels; and an armrest located at least one of to a left of or a right of the seat; wherein a distance between a rearmost point of the upper surface of the seat and an uppermost point of the armrest as measured in a top-bottom direction of the vehicle is not larger than ⅔ of a distance between the rearmost point of the upper surface of the seat and an uppermost point of a grip of the handlebar as measured in the top-bottom direction of the vehicle.

9. The one-occupant electric vehicle according to claim 1, further comprising:

an armrest located at least one of to a left of or a right of the seat; wherein a distance between a rearmost point of the upper surface of the seat and an uppermost point of the armrest as measured in a top-bottom direction of the vehicle is less than about 200 mm.

10. The one-occupant electric vehicle according to claim 1, wherein the seat includes a sitting cushion including a plurality of cushion materials having different amounts of impact resilience, and one of the cushion materials at a location where the buttock of the occupant is to be placed has a higher impact resilience than other cushion materials positioned at other locations of the seat.

11. The one-occupant electric vehicle according to claim 10, wherein in the sitting cushion of the seat, the cushion material positioned at the location where the buttock of the occupant is to be placed includes three stacked layers of cushion materials, and an impact resilience of a middle one of the three layers is higher than that of others of the three stacked layers.

12. The one-occupant electric vehicle according to claim 1, further comprising:

a backrest to support a back of the occupant; wherein along the front-rear direction of the vehicle, a rearmost point of the backrest is located at a same position or forward of a rearmost point of the at least one rear wheel.

13. The one-occupant electric vehicle according to claim 1, further comprising:

a backrest to support a back of the occupant; wherein the backrest is located rearward of an axle of the at least one rear wheel.

14. The one-occupant electric vehicle according to claim 1, wherein a middle of the seat along the front-rear direction of the vehicle is located rearward of a forwardmost point of the at least one rear wheel.

15. The one-occupant electric vehicle according to claim 1, wherein in a side view of the vehicle, an angle θS of the upper surface of the seat relative to a horizontal plane is greater than or equal to 7° and less than or equal to 15°.

\* \* \* \* \*